June 30, 1925.

P. A. WICKES 1,543,888

DIAPHRAGM AIR FRICTION DEVICE

Filed Nov. 13, 1923 2 Sheets-Sheet 1

INVENTOR
P. A. WICKES
BY E.B.Birkenbeuel.
ATTORNEY

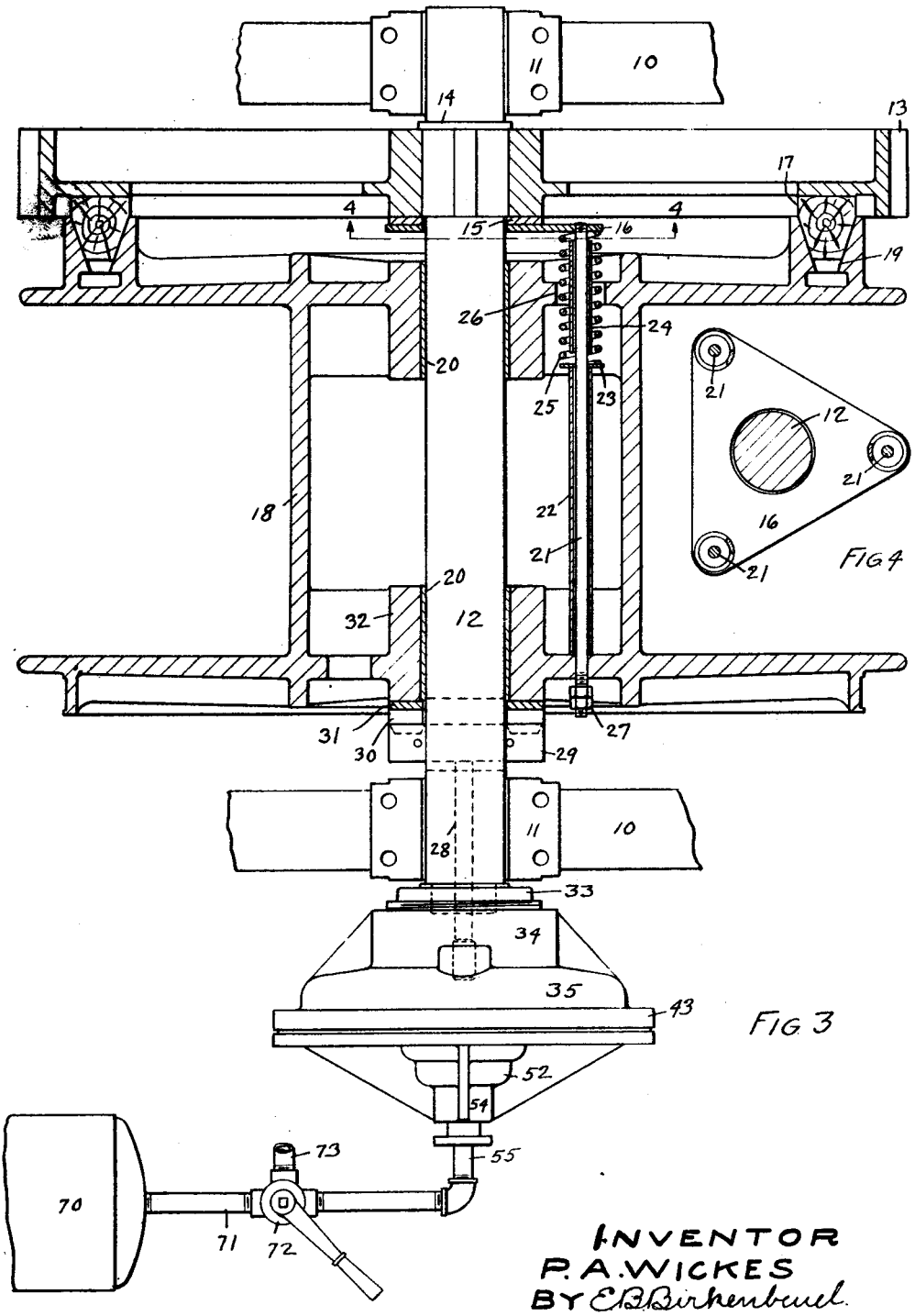

Patented June 30, 1925.

1,543,888

UNITED STATES PATENT OFFICE.

POWERS A. WICKES, OF PORTLAND, OREGON, ASSIGNOR TO WILLAMETTE IRON AND STEEL WORKS, OF PORTLAND, OREGON.

DIAPHRAGM AIR-FRICTION DEVICE.

Application filed November 13, 1923. Serial No. 674,441.

*To all whom it may concern:*

Be it hereby known that I, POWERS A. WICKES, a citizen of the United States, and a resident of Portland, in the county of Multnomah and State of Oregon, have invented a new and useful Diaphragm Air-Friction Device, of which the following is a specification.

This invention relates more particularly to logging engines and similar machines.

The objects of my invention are to provide an exceedingly simple and efficient rotatable air-actuated device for operating friction mechanisms, and having the following characteristics:

First. Exceedingly sensitive to slight changes in applied air pressure.

Second. Has small air displacement.

Third. Is much lighter than other devices for the same purpose.

Fourth. Is easy to manufacture and its parts are readily accessible.

Fifth. No close fits are required in its construction, and it is not unduly affected by wear.

Sixth. It is provided with a "bag" in its diaphragm and supports same over a large area, and therefore permits of greater flexibility in the device and also adds to the life of the diaphragm.

Figure 1:
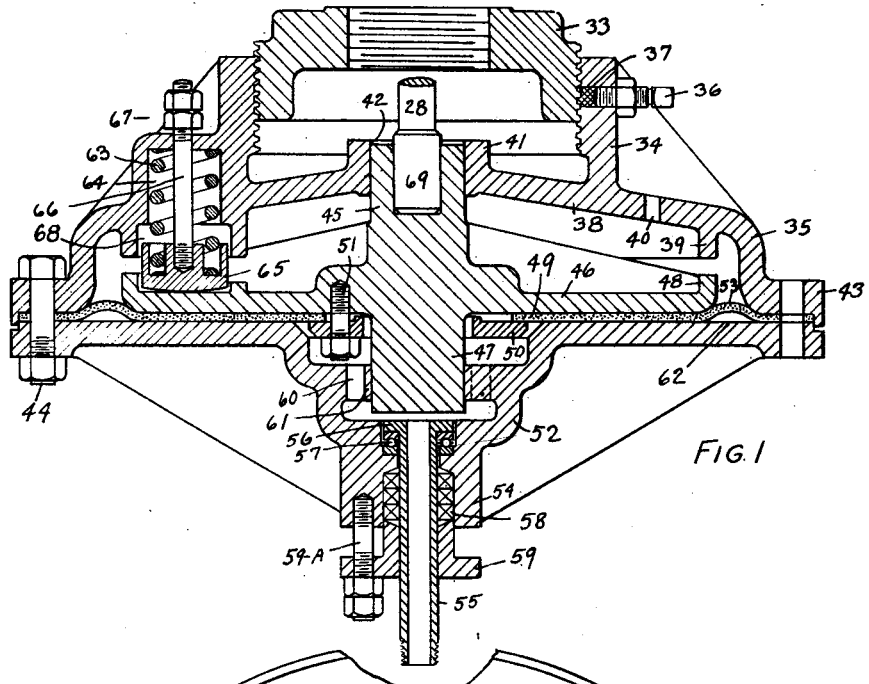
Figure 2:
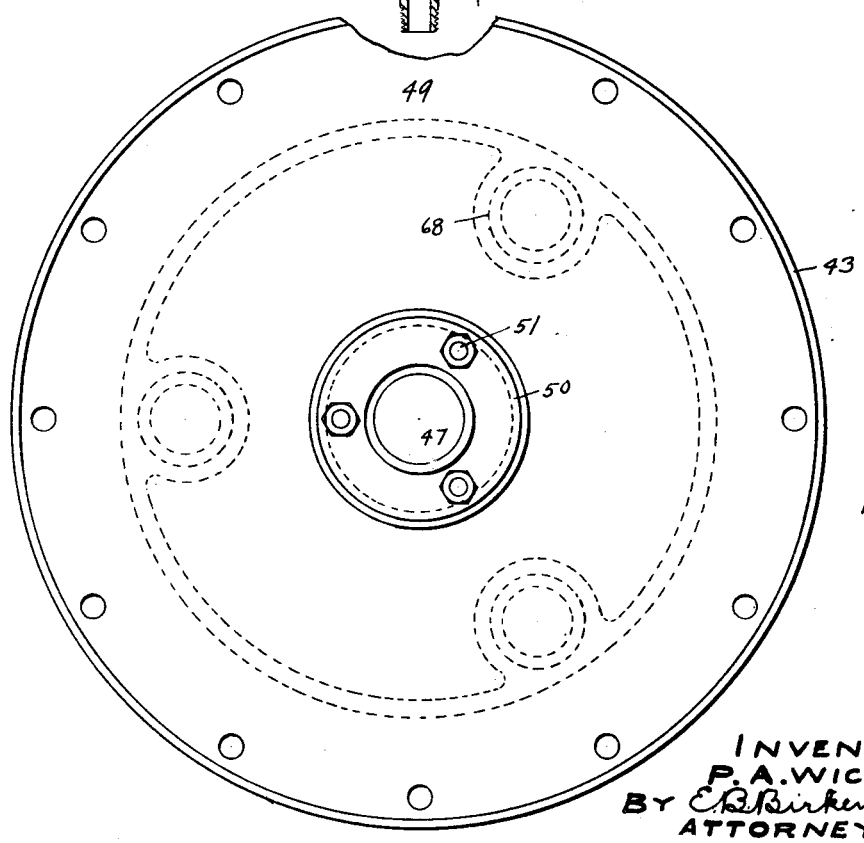

These, and other objects, will be better understood in the specification following and illustrated in the accompanying drawings, in which:

Figure 1 is a section through the device. Figure 2 is an end elevation of the device with the cover removed. Figure 3 is a plan showing the manner in which it is attached to a drum shaft of a logging engine whose drum and gear are shown in horizontal section. Figure 4 is a section along the line 4—4 in Fig. 3.

Similar numbers of reference refer to the same parts throughout the several views.

In order to illustrate the device I have employed the side beams 10 of the usual form employed in logging engines, upon which are placed the bearings 11. Journaling in the bearings 11 is a drum shaft 12, at one end of which is secured a gear 13 against the shoulder 14. A washer 15 is placed against the gear 13. A triangular plate 16 is placed over the shaft 12 against the washer 15.

The gear 13 is provided with the usual friction blocks 17. Rotatably mounted on the shaft 12 is a cable drum 18 provided with a groove 19 on the side of its flange for engaging the blocks 17. It is preferable to provide the drum 18 with bushings 20. Three long bolts 21 pass through the drum 18 and thread into the plate 16. On each bolt 21 is placed a tubular sleeve 22, a washer 23 and a spacer sleeve 24, on which is placed the compression spring 25 between the members 16 and 23. Openings 26 must be provided in the drum side to permit the passage of the springs 25, whose function it is to hold the groove 19 out of engagement with the blocks 17 by sliding the drum 18 along the shaft 12. Nuts 27 are provided on the bolts 21.

The end of the shaft 12 which is opposite the gear 13 is shouldered and threaded for the purpose of attaching the device itself. This threaded end is provided with a central opening in which is placed a plunger 28, one end of which projects from the shaft 12 and the other end engages a bar 29 which is slidably placed in a slot in the shaft 12. The bar 29 also slides in a slot 30 in the friction washer 31 which bears against the hub 32 of the drum 18.

Thus far I have described that portion of a logging device which is common in the art in which the friction is applied by pressure on the plunger 28 which projects from the end of the drum shaft 12.

Referring more particularly to my device, it will be seen that it consists of a shaft nut 33 which threads upon the shaft 12. The outside of the nut 33 is threaded into the hub 34 of the body 35. The hub 34 is provided with a set screw 36 which bears against a copper plug 37 which rides on the thread of the nut 33.

Rising from the floor 38 is a circular wall 39. A relief port 40 is provided in the floor 38. The floor 38 slopes toward the center where is formed a hub 41 having a circular opening 42 concentric with the body 35 and the nut 33. The flange 43 on the body 35 is slightly counterbored and provided with holes for the bolts 44.

Slidably placed in the hole 42 is the inner stem 45 of the diaphragm plate 46, which is also provided with an outer stem 47. An inturned rim 48 on the plate 46 is equal in size to the wall 39, which acts as a stop for the travel of the plate 46.

When the plate 46 is in place, a diaphragm 49, preferably of rubber with suitable reinforcements, is placed in the counterbore of the flange 43, and its center is secured to the plate 46 around the stem 47 by means of the clamping washer 50 and the studs 51. A cover 52 is now placed over the diaphragm 49 and the bolts 44 are used to clamp the outside of the diaphragm 49 between the body 35 and the cover 52.

It will be observed that a "bag" 53 is formed in the diaphragm 49 and that the "bag" lies in the space between the rim 48 and the inner edge of the flange 43, both of which are rounded, as shown. The cover 52 also serves as a guide for the stem 47.

In the hub 54 I have provided a swivel pipe 55 under whose head 56 I have placed a ball bearing 57. Suitable packing 58, a gland 59, and studs 59ᴬ are also provided. Ports 60 are provided in the guide 61 for the passage of air from the pipe 55 to the diaphragm 49, or vice versa.

The diaphragm 49 is normally held against the cover face 62 by the plate 46 which is urged by the springs 63 which rest in the wells 64 in the body 35. The spring holders 65 are held by the bolts 66 equipped with the nuts 67. Pockets 68 are formed on the under side of the body 35 to receive the holders 65.

A friction pin 69 is inserted into the end of the stem 45 and bears against the plunger 28. Air from a tank 70 passes through the pipe 71 into the swivel pipe 55 and its application is controlled by the three-way valve 72 from whose outlet 73 the air may be released from the device as desired.

The operation of my device is as follows: When desiring to drive the drum 18 through the gear 13 the operator manipulates the valve 72 in order to admit air from the tank 70 to the diaphragm 49.

It will be obvious that a very large area of the diaphragm is resting against the plate 46 and that the only unsupported section is the small "bag" 53 which hangs on the rounded edges of the flange 43 and the plate 46. Since the first portion of the movement of the plunger does little work, the only work performed by the device while operating at a reduced diaphragm area is to compress the springs 63 slightly and to bend the diaphragm 49 around the bagged area, and it is evident that the full use of the diaphragm area is obtained before the moment the actual work of applying the friction is begun.

It is evident that the only internal resistance to the movement of the diaphragm is the sliding friction of the stems 45 and 47 in their guides, which is negligible, and to this must be added the force required to bend the diaphragm at the "bag" 53.

In existing devices where cylinders are employed rings are usually used on the pistons, which, of course, permit leakage with corresponding variations in pressure and obvious bad results. When leakage past the piston is reduced by the employment of packing, the increase in friction becomes a serious factor, since a great deal of pressure must be applied to overcome this friction, plus the inertia of the parts, and when the piston does move it moves very rapidly, usually with a pound, when the slack in the friction is taken up, and also a very severe application of the friction due to the additional power applied and the momentum of the heavy parts.

It will be seen that no small advantage is gained by employing a diaphragm since the center of gravity of the device is moved much nearer to the end of the shaft 12 than is possible with any piston-operated device having the same thrust capacity. Not only is the center of gravity of the device moved nearer to the end of the shaft, but its weight is actually reduced to about one-third of that of the piston devices. It is the great overhang and the weight while rotating on the end of a shaft, which makes the piston devices exceedingly difficult to be kept in satisfactory working order.

Wear on the blocks 17 beyond the range of this device is taken up by rotating the body 35 on the nut 33 and resecuring same by means of the screw 36.

It will be understood that the device is expressly designed for short travel, the function of the nut 33 being to bring the required movement within the range of the device. A secondary function of the nut is to permit the device to be attached to either end of a shaft, or to different sized shafts, by merely using a nut which would fit that shaft and the hub 34.

I am aware that diaphragm devices have been employed for the purpose of set brakes on trains, automobiles, etc., I therefore do not claim my device broadly but intend to cover such forms and modifications as fall fairly within the appended claims.

What I claim as new is:

1. A diaphragm air friction device consisting of a cylindrical body member, a diaphragm plate slidably mounted in said body member extending almost to the side walls of said body, a diaphragm across the end of said body and resting against said plate adapted to bag between said side walls and the outside of said diaphragm plate, and a cover member adapted to clamp said diaphragm to said body and guide its end of said diaphragm plate.

2. A diaphragm air friction device consisting of a cylindrical body member, a shaft nut threaded in the closed end of said body for the purpose of supporting the device on the end of a shaft and providing a takeup for wear in the friction blocks, a friction diaphragm plate having a stem projecting from each side, one of said stems guiding in said body concentrically with said nut, a diaphragm across the open end of said body adapted to "bag" into the space between said plate and body, a cover over said diaphragm guiding one of said stems which projects through said diaphragm, a clamping ring for securing the center of said diaphragm to said plate, stop means for limiting the travel of said plate, means for admitting air through said cover against said diaphragm, and springs in said body for returning said plate to its point of rest when the air pressure is released.

3. A rotatable device for actuating a plunger projecting from a rotatable shaft consisting of a cylindrical body member having a bulging closed end and having an internally threaded hub projecting from said bulging end, a shaft nut internally threaded for the purpose of securing same to a shaft end, said nut having an external thread formed thereon to receive said body, means for locking said hub against rotation with relation to said nut, a circular diaphragm plate within said body extending almost to its side walls, a stem projecting from each side of said plate, one of said stems guiding in the bulging end of said body and engaging the end of the shaft plunger, a rubber diaphragm placed over the second stem, a clamping washer for securing the center of said diaphragm to said plate, a cover over said diaphragm which holds the outer edges of the diaphragm to the body and guides the stem which projects through the diaphragm, and means for admitting air through said cover against said diaphragm.

POWERS A. WICKES.